(12) United States Patent
Kim

(10) Patent No.: US 6,853,691 B1
(45) Date of Patent: Feb. 8, 2005

(54) VECTOR MODULATOR USING AMPLITUDE INVARIANT PHASE SHIFTER

(75) Inventor: Wang Rae Kim, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/451,108

(22) Filed: Nov. 30, 1999

(30) Foreign Application Priority Data

Dec. 11, 1998 (KR) .......................................... 98/54501

(51) Int. Cl.[7] .............................................. H04L 27/20
(52) U.S. Cl. ...................................... 375/308; 375/353
(58) Field of Search ................................ 375/219, 295, 375/316, 353, 308

(56) References Cited

U.S. PATENT DOCUMENTS 5,119,399 A * 6/1992 Santos et al. ............... 375/224
5,760,646 A * 6/1998 Belcher et al. ............. 330/149
5,852,389 A * 12/1998 Kumar et al. ............... 332/103

* cited by examiner

Primary Examiner—Mohammed Ghayour
Assistant Examiner—Pankaj Kumar
(74) Attorney, Agent, or Firm—Fleshner & Kim, LLP

(57) ABSTRACT

A vector modulator is disclosed which includes a first amplitude invariant phase shifter for shifting a phase of a received signal at fixed intervals within a preset first shifting range and a quadrature hybrid coupler for separating an output of the first amplitude invariant phase shifter into at least two different channel signals having a 90° phase difference to each other. A second amplitude invariant phase shifter shifts a phase of a first channel signal among outputs of the quadrature hybrid coupler by a fixed amplitude within a prescribed second shifting range and a third amplitude invariant phase shifter shifts a phase of a second channel signal among outputs of the quadrature hybrid coupler by a fixed amplitude within a prescribed third shifting range. A combiner receives signals for the second and third invariant phase shifters and calculates a vector sum, allowing for a vector of a modulated signal on all regions of a polar coordinate system by expanding a range of variation of a received RF signal.

18 Claims, 6 Drawing Sheets

VECTOR MODULATOR USING AMPLITUDE INVARIANT PHASE SHIFTER

BACKGROUND OF THE INVENTION

1. Field of the Invention

The present invention relates to a vector modulator in a mobile communication system.

2. Background of the Related Art

In general, a Radio Frequency (RF) system changes a frequency, or controls an amplitude and a phase of a signal. The signal denotes a quantity (for example, current, voltage, frequency, etc.) which can be specifically observed. The modulation is a form of a signal suitable for transmission to remote destination in a noiseless state. In the RF field, amplifiers (which are RF control devices), attenuators, phase shifters, and switches are used for changing an amplitude and phase of a received signal, thereby controlling the received signal. The vector modulator, which is another such RF signal control device, has an active device and a passive device combined, and is suitable for controlling the amplitude and the phase on the same time.

FIG. 1 illustrates a block diagram showing a system of a related art vector modulator. Referring to FIG. 1, a quadrature hybrid coupler 11 is provided for receiving a RF signal through an input terminal thereon and separating the RF signal into an I-channel and a Q-channel. The Q-channel signal separated by the quadrature hybrid coupler 11 is provided to a first biphase modulator 12, and the I-channel signal is provided to the second biphase modulator 13. The I and Q-channel signals have the same amplitudes, but with a 90° phase difference.

The first biphase modulator 12 modulates only a phase of a received Q channel signal in a range of 0° or 180°, and the second biphase modulator 13 modulates only a phase of a received I channel signal in a range of 0° or 130°. Therefore, most phase modulators 12 and 13 are biphase modulators which shift only the phases of the signals within a range of 0° or 180° and not the amplitudes of the signals. The first and second phase invariant attenuators 14 and 15 adjust only the amplitudes of the channel signals from the biphase modulators 12 and 13 according to their own ranges of attenuations, respectively. The combiner 16 combines signals from the first and second phase invariant attenuators 14 and 15 and forwards the combined signal through an output terminal. The attenuation ranges of the first and second phase invariant attenuators 14 and 15 are proportional to an entire range of variation of a vector modulator as shown in equation (1), below.

$$R=10^{-(X/20)} \quad (1)$$

In equation 1, X is an attenuation value dB of each phase invariant attenuator and R is an output of the vector modulator. The attenuation ranges of respective phase invariant attenuators can be expressed as equations (2) and (3).

$$I(dB)=20 \log(R \cos \theta) \quad (2)$$

$$Q(dB)=20 \log(R \sin \theta) \quad (3)$$

When the attenuation values dB of the phase invariant attenuators operative as equations (2) and (3) are varied up to 20 dB at 1 dB intervals, outputs of the vector modulator are as shown in FIG. 3. Therefore, as the attenuation ranges of the phase invariant attenuators 14 and 15 become greater, the ranges of variation of the vector modulator become greater in proportion to the attenuation ranges. Such a vector modulator is called as an I-Q vector modulator.

The I-Q vector modulator shown in FIG. 1 will be described. It is assumed that a RF signal with a phase angle of θ is provided to the I-Q vector modulator shown in FIG. 1. The quadrature hybrid coupler 11 provides an I channel signal with a phase angle θ' through one path, and a Q channel signal with a phase angle of θ+90° through another path. The first biphase modulator 12 and the second biphase modulator 13 shift phases of the channel signals within ranges of 20° or 180°, respectively. Therefore, a range of phase of the Q channel signal which can be provided from the first biphase modulator 12 is θ'~θ'+180°, and a range of phase of the I channel signal which can be provided from the second biphase modulator 13 is θ'+90°~θ'+270°.

However, as shown in FIG. 3, the related art I-Q vector modulator controls the amplitude and the phase of a received RF signal within a limited range, which can be verified by determining whether the modulated signal, output of the I-Q vector modulator, covers all regions of a polar coordinate system. The related art I-Q vector modulator can not vary the amplitude and the phase of the received signal to cover all sections of the polar coordinate system. Further, in order to express a vector having a very small amplitude in the vicinities of the I and Q axes, the attenuation value should be very small requiring an attenuator with a great attenuation range or many steps of attenuators. Since an amplifier is required additionally to express a value outside of the existing I-Q vector modulator range, the related art vector modulator has a limited range of use.

The above references are incorporated by reference herein where appropriate for appropriate teachings of additional or alternative details, features and/or technical background.

SUMMARY OF THE INVENTION

An object of the present invention to provide a vector modulator that substantially obviates one or more of the problems due to limitations and disadvantages of the related art.

Another object of the present invention is to provide a vector modulator which can extend a variation range of a RF signal for displaying a modulated signal vector on all regions of a polar coordinate system.

Another object of the present invention is to provide a linearizer for a high power amplifier having a vector modulator of the present invention.

To achieve these objects and other advantages in whole or in parts, and in accordance with the purpose of the present invention, as embodied and broadly described, one embodiment includes the vector modulator having a first amplitude invariant phase shifter for shifting a phase of a received signal at fixed intervals within a preset first shifting range, a quadrature hybrid coupler for separating an output of the first amplitude invariant phase shifter into at least two different channel signals having a 90° phase difference to each other, a second amplitude invariant phase shifter for shifting a phase of a first channel signal among outputs of the quadrature hybrid coupler by a fixed amplitude within a preset second shifting range, a third amplitude invariant phase shifter for shifting a phase of a second channel signal among outputs of the quadrature hybrid coupler by a fixed amplitude within a preset third shifting range, and a combiner for receiving signals from the second and third invariant phase shifters and calculating a vector sum.

In another embodiment of the present invention, there is provided a linearizer for a high power amplifier including a divider for dividing a received signal into a first signal and a second signal, a vector modulator for receiving the first signal and subjecting to vector modulation in response to a control signal, an amplifier for amplifying a signal from the vector modulator to a preset amplification ratio, a directional coupler for sampling a signal form the amplifier, and a fast phase-amplitude controller for comparing amplitudes and phases of a sampling signal detected at the directional coupler and the second signal delayed for a time period, to provide the control signal, wherein the vector modulator includes a first amplitude invariant phase shifter for shifting a phase of the first signal at fixed intervals within a preset first shifting range, a quadrature hybrid coupler for separating an output of the first amplitude invariant phase shifter into at least two different channel signals having a 90° phase difference to each other, a second amplitude invariant phase shifter for shifting a phase of a first channel signal among outputs of the quadrature hybrid coupler by a fixed amplitude within a preset second shifting range, a third amplitude invariant phase shifter for shifting a phase of a second channel signal among outputs of the quadrature hybrid coupler by a fixed amplitude within a preset third shifting range, and a combiner for receiving signals from the second and third invariant phase shifters and calculating a vector sum thereof.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
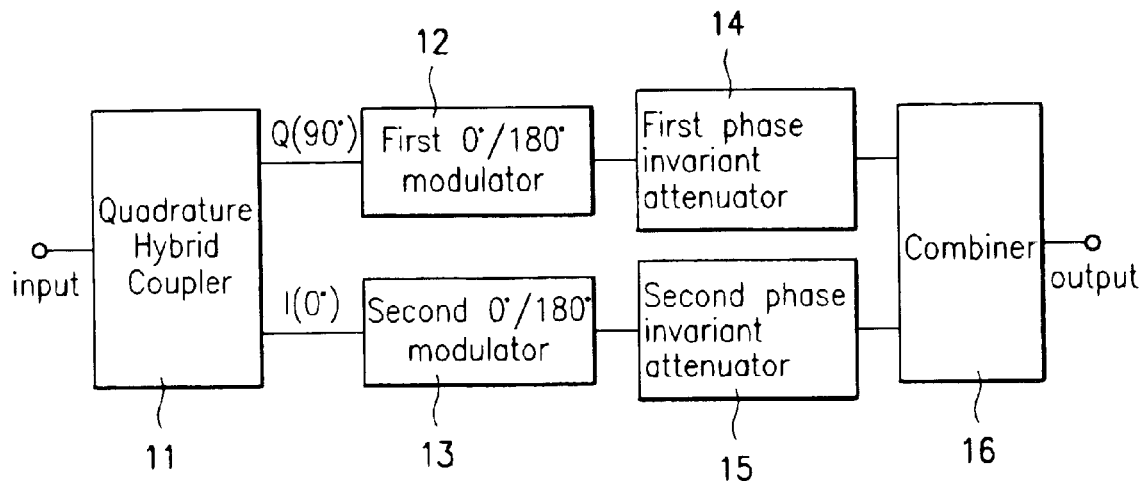
FIG. 1 is a drawing that illustrates a block diagram showing a system of a related art I-Q vector modulator.
Figure 2:
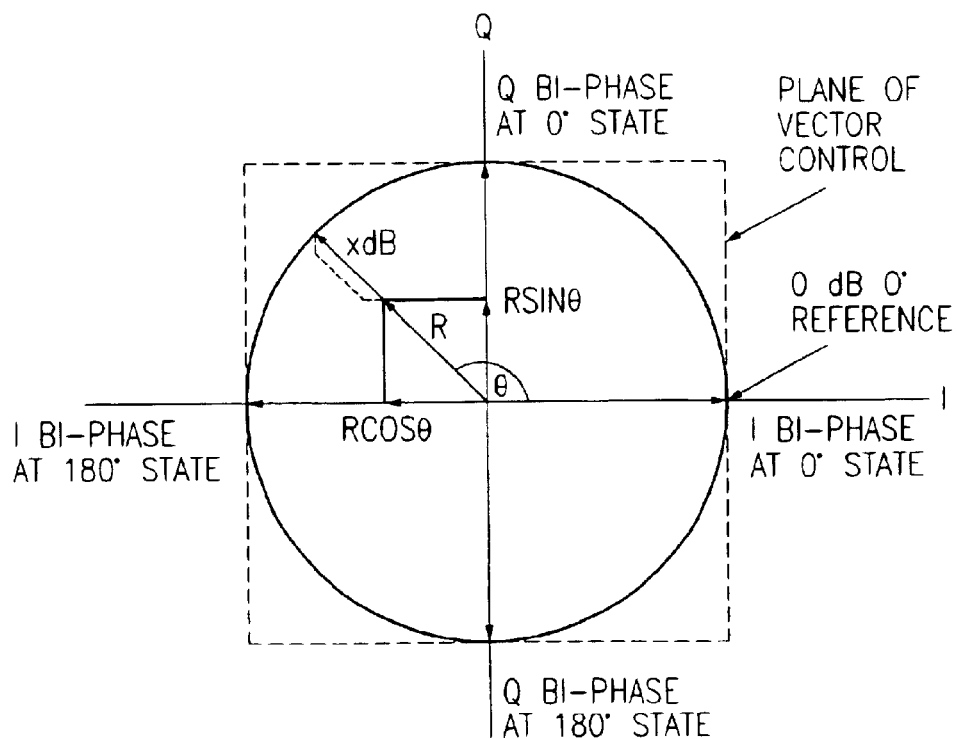
FIG. 2 is a drawing that illustrates an I-Q phase relation of FIG. 1.
Figure 3:
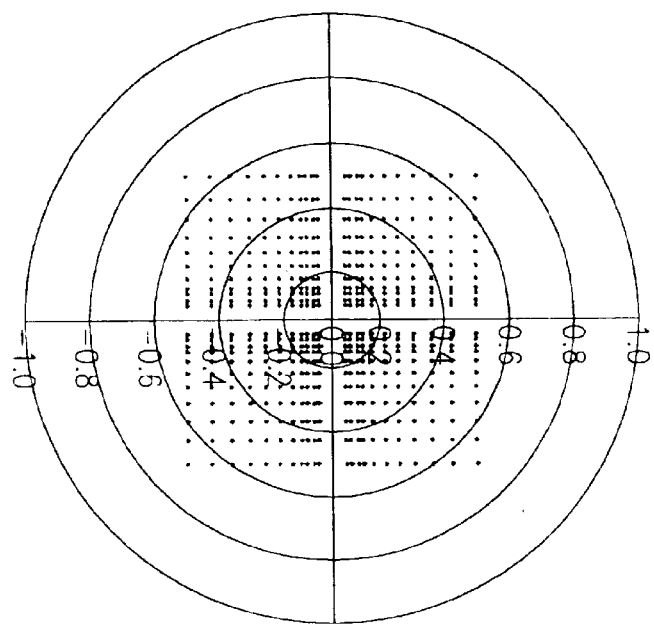
FIG. 3 is a drawing that illustrates output characteristics of the I-Q vector modulator in FIG. 1.
Figure 4:
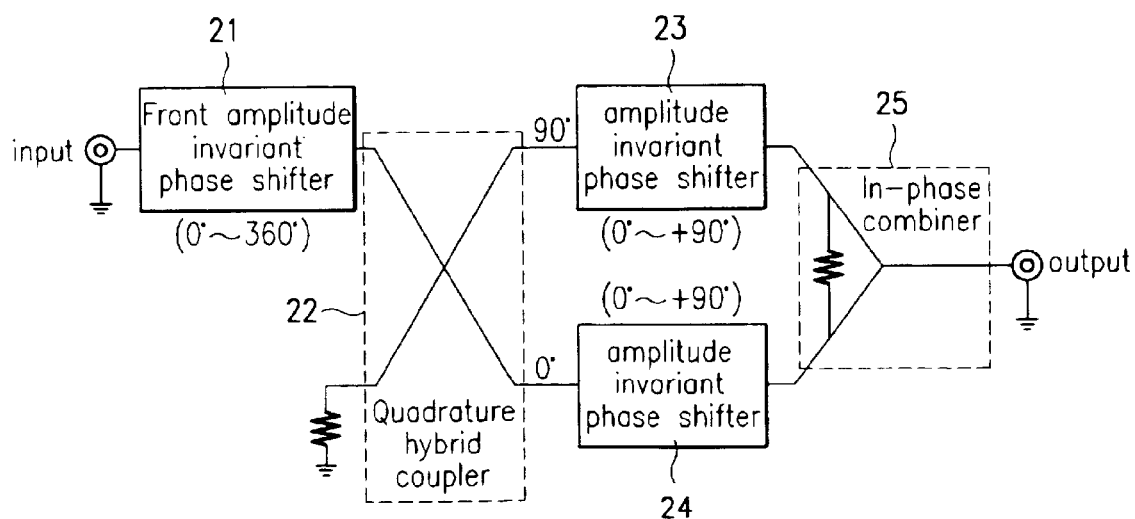
FIG. 4 is a drawing that illustrates a block diagram showing a system of an I-Q vector modulator in accordance with a preferred embodiment of the present invention.

Referring to FIG. 4, the I-Q vector modulator according to a preferred embodiment of the present invention includes a first amplitude invariant phase shifter 21 for receiving and shifting a phase of a RF signal within a range of 0° to 360°, and a quadrature hybrid coupler 22 for converting a signal from the first amplitude invariant phase shifter 21 into an I-channel signal and a Q-channel signal having the same amplitudes and a 90° phase difference. A second amplitude invariant phase shifter 23 shifts a phase of a first output of the quadrature hybrid coupler 22 within 0° to +90° without changing an amplitude of the Q-channel signal of the output of the quadrature hybrid coupler 22, and a third amplitude invariant phase shifter 24 shifts a phase of a second output of the quadrature hybrid coupler 22 within 0° to +90° without changing an amplitude of the I-channel signal of the output of the quadrature hybrid coupler 22. A combiner 25 receives outputs of the second and third amplitude invariant phase shifters 23 and 24 and calculates a vector sum.

Provided the quadrature hybrid coupler 22 is of a microstrip, the quadrature hybrid coupler 22 may, for example, be a Branch line, Lange coupler, or a Wilkinson divider. If the quadrature hybrid coupler is the Wilkinson divider, lines having a 90° phase difference to each other are connected to two output ports of the divider. Recently, there have been many surface mount technology (SMT) products provided for different frequencies, and those modules have mostly been used as the quadrature hybrid coupler. 22. However, as the quadrature hybrid coupler conducts an important role of determining I and Q paths, characteristics of the vector modulator are dependent on an amplitude balance or a phase balance, and an amplitude unbalance or a phase unbalance acts as an amplitude or phase error of the vector modulator.

In general, a characteristic of the first, second and third amplitude invariant phase shifters 21, 23 and 24 is that insertion losses of these first to third amplitude invariant phase shifters 21, 23 and 24 are dependent on phase shifts. Additionally, a range of the phase shift and a variation of the insertion loss caused by the phase shift are important factors for determining a grade of the amplitude variant phase shifter. The variation of the insertion loss caused by the phase shift is dependent on an amount of error of the phase shifter, and the insertion loss is controlled to be below 1 dB and the characteristics to be within 0.2 dB/90°.

Figure 8A:
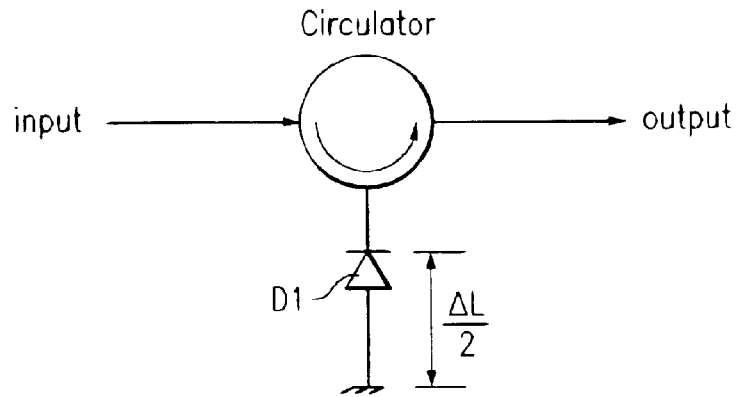
FIGS. 8A–8C are drawings which illustrate circuits of amplitude invariant phase shifters of embodiments of the present invention; and, FIG. 9 is a drawing that illustrates a block diagram showing the I-Q vector modulator as embodied in the present invention applied to a high power amplifier.
Figure 8B:
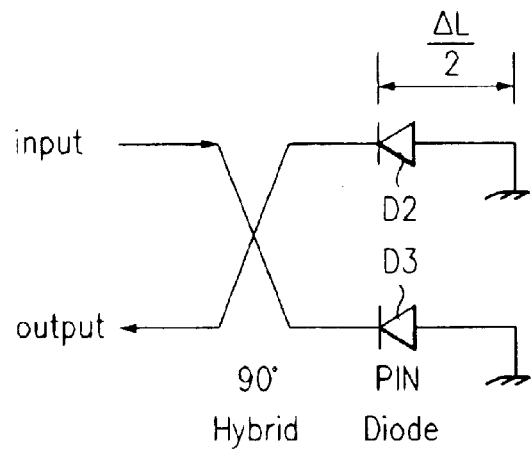
Figure 8C:
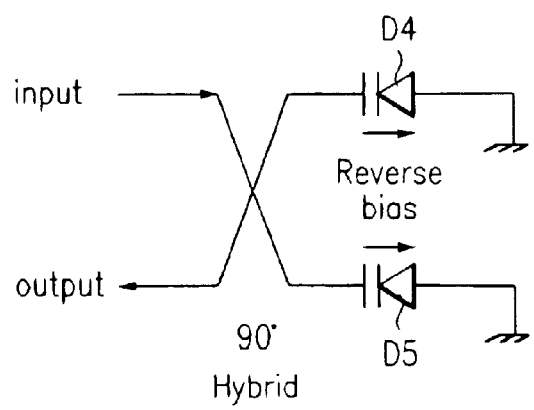

FIGS. 8A–8C illustrate circuits of reflection form amplitude invariant phase shifters according to one embodiment of the present invention having varactor diodes or PIN diodes. A junction capacitor in the PIN diode exhibits a low capacitance value at a radio frequency, which increases in a forward direction bias. Under a second state, the PIN diode has the advantage that it is not sensitive to temperature, can control high power, and generates a small amount of harmonics.

FIG. 8A illustrates a circular type amplitude invariant phase shifter using the PIN diode, and FIG. 8B illustrates a 90° hybrid coupler type amplitude invariant phase shifter. As shown in FIGS. 8A and 8B, diodes D1–D3 are coupled to ground through respective transmission lines. Depending on a length of the line, an amount of the phase shift is determined. The diodes D1–D3 operate in two states. That is, in a turned on state (in a low resistance mode), a signal will be transmitted up to an end of a transmission line and reflected at the end. In a turned off state (in a high resistance mode), the signal will be reflected at the diodes D1–D3. Therefore, the reflected signal will be forwarded through an output port as it is. The amount of phase shift can be expressed as shown in equation (4) below depending on the diode, a transmission line length $\Delta L$, and signal wavelength $\lambda$.

$$\theta = \frac{2\pi \Delta L}{\lambda} \quad (4)$$

FIG. 8C illustrates a reflection type amplitude invariant phase shifter circuit using varactor diodes, according to an embodiment of this invention. Referring to FIG. 8C, the varactor diode D4 or D5, which is a variable reactance device, can shift phase according to a bias voltage, because the varactor diode has a characteristic that a capacitance of the diode is reduced as a reverse bias voltage is increased. Though the varactor diode D4 or D5 has components of resistance R, inductance L and capacitance C, an amount of the phase shift can be expressed as shown in equation (5) below, if it is assumed that the varactor diode D4 or D5 has only a pure reactance component, disregarding the resistance component R.

$$\theta = -\frac{\pi}{2} + \tan^{-1}\left\{ \frac{2\left(\frac{\omega L}{Z_0} - \frac{1}{Z_0 \omega C}\right)}{\left(\frac{\omega L}{Z_0} - \frac{1}{Z_0 \omega C}\right)^2 - 1} \right\} = -\frac{\pi}{2} + \tan^{-1}\left\{ \frac{2\left(\frac{X_L - X_C}{Z_0}\right)}{\left(\frac{Z_L - X_C}{Z_0}\right)^2 - 1} \right\} \quad (5)$$

In equation (5), C denotes a capacitance of the diode D4 or D5, L is an inductance of the diode D4 or D5, $X_C$ denotes a capacitive reactance of the diode D4 or D5, and $X_L$ denotes an inductive reactance of the diode D4 or D5. Accordingly, an embodiment of the vector modulator of the present invention may be directly controlled by using an application program after the analog control values have been determined using the equations (4) and (5), may be implemented using a look-up table, or the like.

The operation of the phase modulator of an embodiment of the present invention will now be described. A RF signal provided to the first amplitude invariant phase shifter 21 is phase shifted within a range of 0°~360°. The first amplitude invariant phase shifter 21 varies a phase of a signal to be provided to the quadrature hybrid coupler 22, which is coupled to the first amplitude invariant phase shifter 21. This phase shift reduces a range of a polar coordinate system region which is otherwise not presently obtainable, and varies the amplitude of the signal in an increased range. Namely, the resultant vectors in the vicinity of the I or Q axis can be obtained by varying the phase angles, and is therefore not dependent on the limitations of an attenuator circuit.

The quadrature hybrid coupler 22 divides an output of the first amplitude invariant phase shifter 21 into a Q channel signal and an I channel signal having a 90° phase difference relative to each other. Only a phase of the Q channel signal is shifted within a range of 0°~90° by the second amplitude invariant phase shifter 23 without change of the amplitude, and only a phase of the I channel signal is shifted within a range of 0°~90° by the third amplitude invariant phase shifter 24 without change of the amplitude. Then, the combiner 25 combines outputs of the second and third invariant amplitude phase shifters 23 and 24 to provide a vector sum.

Figure 5:
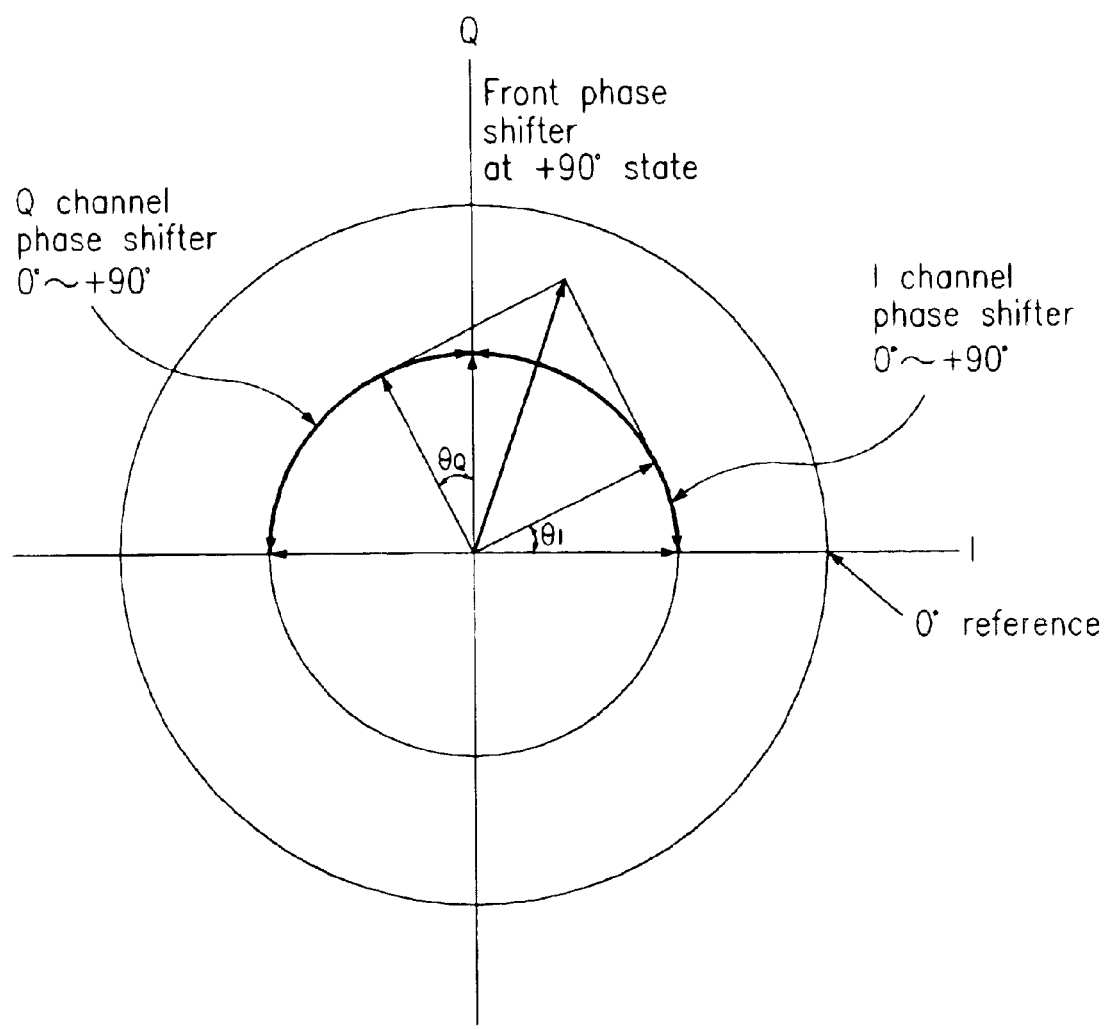
FIG. 5 is a drawing that illustrates an I-Q phase relation of an I-Q vector modulator of an embodiment of the present invention.
Figure 6:
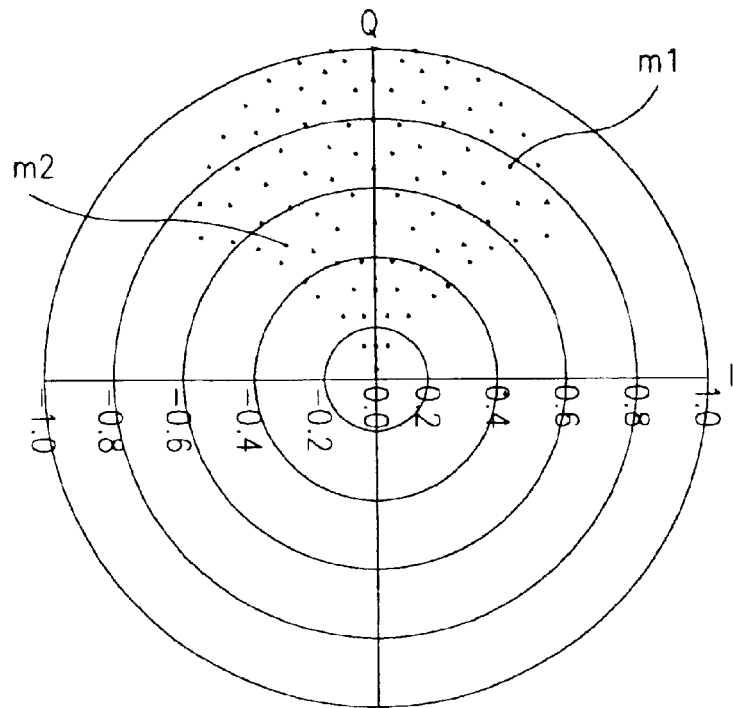
FIGS. 6 and 7 are drawings which illustrate output characteristics of the I-Q vector modulator of an embodiment of the present invention.

A signal provided thus is well distributed on a polar coordinate region within a range of phase angle of $\theta_I+45°\sim\theta_Q+45°$. Moreover, the vector modulator of an embodiment the present invention can also express a vector with a great amplitude which cannot be varied by means of the related art vector modulator well on the polar coordinate region, and can provide a vector having a very small amplitude. For example, provided that the first amplitude invariant phase shifter 21 is fixed at 90° and the second and the third amplitude invariant phase shifters 23 and 24 are made to have one phase shift, a final output vector will have a form as shown in FIG. 5. And, provided that the first amplitude invariant phase shifter 21 is fixed at 90°, the second amplitude invariant phase shifter 23 is fixed at 20°, and the third amplitude invariant phase shifter 24 is fixed at 20°, the amplitude K of the output vector is K≅0.707, and the phase θ of the output vector is θ≅65° according to following equations (6) and (7). This position may be represented on the polar coordinate system as m1, as shown in FIG. 6. If, however, the first amplitude invariant phase shifter 21 is fixed at 90°, the second amplitude invariant phase shifter 23 is fixed at 80°, and the third amplitude invariant phase shifter 24 is fixed at 50°, the amplitude K of the output vector is K≅0.5, and the phase θ of the output vector is θ≅110°. This position may be represented on the polar coordinate system as m2, as shown in FIG. 6.

$$K = \left| \cos\left\{ \frac{\theta_Q + 90 - \theta_I}{2} \right\} \right| \quad (6)$$

$$\theta = \theta_R + \tan^{-1}\left\{ \frac{\sin\theta_Q + \sin(-90 + \theta_I)}{\cos\theta_Q + \cos(-90 + \theta_I)} \right\} = \theta_R + \tan^{-1}\left\{ \frac{\sin\theta_Q - \cos\theta_I}{\cos\theta_Q + \sin\theta_I} \right\} \quad (7)$$

Next, if the first amplitude invariant phase shifter 21 is fixed at 90°, and the second and third amplitude invariant phase shifters 23 and 24 are varied from 0°~90° at 10° intervals, a final output vector has a form as shown in FIG. 6. If, however, the first amplitude invariant phase shifter 21 is varied from 0° to 360° at 20° intervals, and the second and third amplitude invariant phase shifter 23 and 24 are varied from 0°~90° at 10° intervals, a final output vector has a form as shown in FIG. 7.

Figure 7:
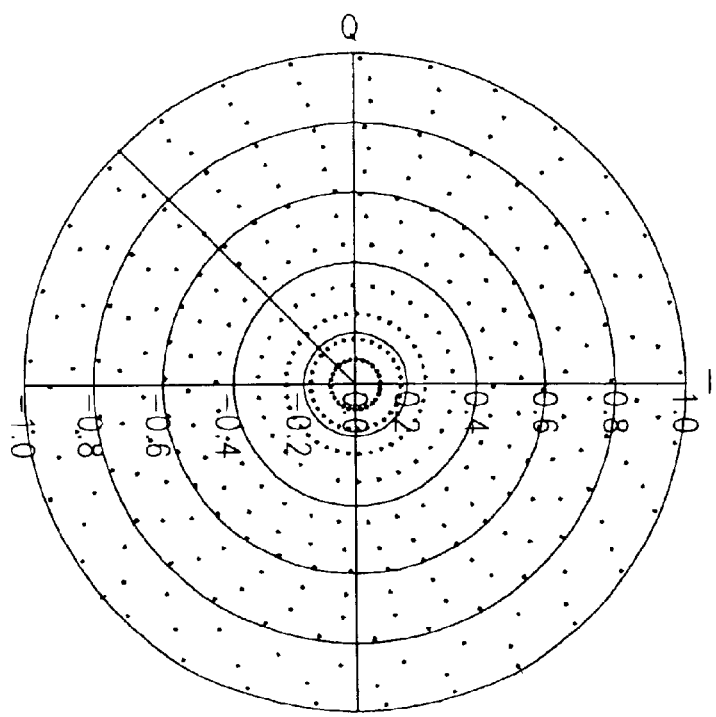

Therefore, as shown in FIGS. 6 and 7, the vector modulator of an embodiment of the present invention can distribute a signal to a particular region at a desired amplitude on a polar coordinate system by controlling modulated phases of the first to third amplitude invariant phase shifters 21, 23 and 24. It can further distribute the signal uniformly over the entire polar coordinate system region, and can vary the amplitude of the signal widely by an appropriate phase shifting. Also, because the embodiments of the I-Q vector modulators of the present invention can obtain a signal of a user desired phase and amplitude on almost all regions on the polar coordinate system, the I-Q vector modulator can improve a RF signal control performance.

Additionally, though error components of the related art vector modulator have an amplitude error (variation of the amplitude caused by a variation of the phase) of the phase shifters and a phase error (a variation of the phase caused by a variation of the amplitude) of the attenuator, the present invention has fewer sources of errors because the only source of errors is the amplitude errors of the amplitude invariant phase shifters. Accordingly, the application of the vector modulator of the present invention to a radio communication system which employs a radio frequency or to a measuring instrument in the communication field can provide very excellent performance.

Figure 9:
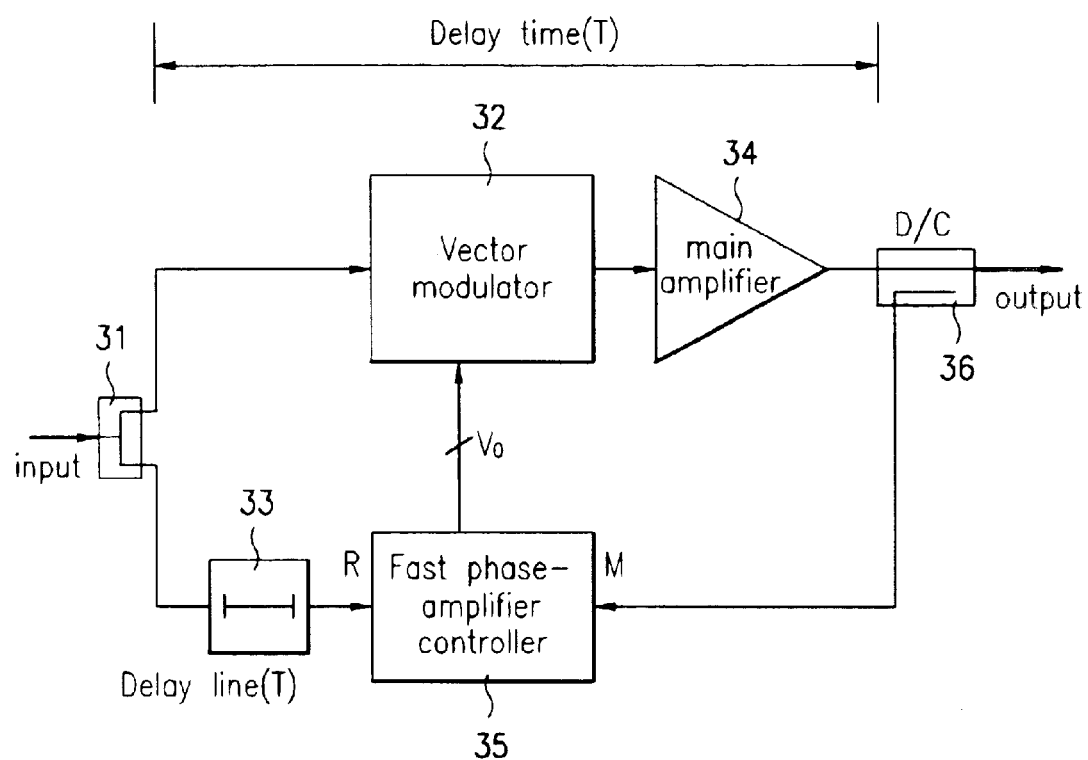

In another embodiment, the vector modulator of the present invention can be implemented with a linearizer, such as a high power amplifier, or a radar system, and used to compensate a distortion of the radio signal. Referring to FIG. 9, the high power amplifier having the I-Q vector modulator of this embodiment of the present invention applied thereto includes a divider 31 for dividing a signal and a vector modulator 32 for expanding a range of variation of a RF signal so that a vector of a signal from the divider 31 can be exhibited on all regions of the polar coordinate system. A main amplifier 34 is connected to an output terminal on the vector modulator 32 for amplifying a signal from the vector modulator 32 to a preset amplification ratio and a directional coupler 36 is coupled for sampling a signal from the main amplifier 34. A delay 33 delays other signals divided at the divider 31, and a fast phase-amplitude controller 35 compares a reference signal R from the delay 33 and a sampling signal M from the directional coupler 36, to detect an amplitude and a phase error generated in the high power amplifier shown in FIG. 9, for controlling an amplitude and a phase of the vector modulator 32.

Referring to FIG. 9, by comparing the reference signal R and the main amplifier 34 at the fast phase-amplitude controller 35, to detect an amplitude and a phase error generated in the high power amplifier shown in FIG. 9, and controlling an amplitude and a phase at the vector modulator, distortions of AM-AM, and AM-FM which occur at the main amplifier 34 can be reduced, thereby reducing signal distortion caused by a nonlinear characteristic of the main amplifier.

As described above, preferred embodiments of a vector modulator and linearizer have various advantages. In particular, they have increased signal strengths relative to the related art as shown by the vector K. Moreover, they are capable of greater attenuation, especially close to the axes, relative to the related art. Additionally, the phase and amplitude can be varied to cover all regions in a polar coordinate system, thereby expanding a range of variation of an RF signal relative to the related art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A vector modulator, comprising:
    a first phase shift to shift a phase of an input signal within a shifting range of 0°~360°;
    a hybrid coupler to separate an output of the first phase shifter into first and second channel signals, wherein the first channel signal is an I channel signal and the second channel signal is a Q channel signal that is phase shifted approximately 90° from the I channel signal;
    a second amplitude invariant phase shifter to shift a phase of the first channel signal;
    a third amplitude invariant phase shifter to shift a phase of the second channel signal; and
    a combiner that receives and combines signals from the second and third invariant phase shifters and provides an output, wherein the first phase shifter, the second amplitude invariant phase shifter and the third amplitude invariant phase shifter, respectively, shift within first, second, and third prescribed shifting ranges.

2. The vector modulator of claim 1, wherein the coupler is quadrature hybrid coupler selected from one of a branch line, a Lange coupler, and a Wilkinson divider.

3. The vector modulator of claim 1, wherein the first phase shifter delays the input signal by fixed intervals within a first prescribed shifting range of approximately 0°~360°.

4. The vector modulator of chim 1, wherein the second amplitude invariant phase shifter delays the first channel signal by a prescribed phase within a variable phase range of approximately 0°~90°.

5. The vector modulator of claim 1, wherein the third amplitude invariant phase shifter delays the second channel signal by a prescribed phase within a variable phase range of approximately 0°~90°.

6. The vector modulator of claim 1, wherein each of the first phase shifter, the second amplitude invariant phase shifter and the third amplitude invariant phase shifter comprises a reflection type amplitude invariant phase shifter.

7. The vector modulator of claim 1, wherein the combiner calculates a vector sum, wherein the first phase shifter delays the input signal by fixed intervals within the first prescribed shifting range, wherein the second and third amplitude invariant phase shifters delay the first and second channel signals by first and second phases within the second and third prescribed shifting ranges respectively, and wherein the second and third prescribed shifting ranges are variable.

8. The vector modulator of claim 1, wherein the first phase shifter adjusts a distribution of signals outputted from a combiner in a polar coordinate system by adjusting phases of incoming signals.

9. The vector modulator of claim 6, wherein each of the first phase shifter, the second amplitude invariant phase shifter and the third amplitude invariant phase shifter includes at least one PIN diode and a hybrid coupler.

10. The vector modulator of claim 6, wherein each of the first phase shifter, the second amplitude invariant phase shifter and the third amplitude invariant phase shifter includes at least one varactor diode and a hybrid coupler.

11. The vector modulator of claim 6, wherein each of the first phase shifter, the second amplitude invariant phase shifter and the third amplitude invariant phase shifter includes at least one PIN diode and a circulator.

12. A vector modulator, comprising
    a fist amplitude invariant phase shifter for shifting a phase of a received signal at prescribed intervals within a phase shifting range of approximately 0°~360°;
    a quadrature hybrid coupler for separating an output of the first amplitude invariant phase shifter into I and Q channel signals shifted substantially 90° in phase relative to each other;
    a second amplitude invariant phase shifter for shifting a phase of the I channel signal by a first amplitude within a phase shifting range of approximately 0°~90°;
    a third amplitude invariant phase shifter for shifting a phase of the Q channel signal by a second amplitude within a phase shifting range of approximately 0°~90°; and
    a combiner for receiving signals from the second and third amplitude invariant phase shifters and calculating a vector sun thereof, wherein the first, second, and third amplitude invariant phase shifters respectively shift within first, second, and third prescribed shifting ranges.

13. The vector modulator of claim 12, wherein the first, second, and third amplitude invariant phase shifters are reflection type amplitude invariant phase shifters, and the first amplitude invariant phase shifter delays the input signal by fixed intervals within a first prescribed shifting range, and the second and third amplitude invariant phase shifters delay the I and Q channel signals by first and second phases within a variable phase range, respectively.

14. The vector modulator of claim 12, wherein the combiner calculates a vector sum, wherein the first phase shifter delays the input signal by fixed intervals within the first prescribed shifting range, wherein the second and third amplitude invariant phase shifters delay the first and second channel signals by first and second phases within the second and third prescribed shifting ranges respectively, and wherein the second and third prescribed shifting ranges are variable.

15. A circuit for a high power amplifier, comprising:
- a divider to divide an input signal into a first signal and a second signal;
- vector modulator to receive the first signal and a control signal and output a vector modulated signal;
- an amplifier to amplify the vector modulated signal;
- a directional coupler to receive a signal from the amplifier and generate a reference signal;
- a delay to delay the second signal by a prescribed time period; and
- a fast phase-amplitude controller to compare amplitudes and phases of the reference signal and the delayed second signal to provide the control signal, wherein the vector modulator comprises:
  - a first amplitude invariant phase shifter to shift a phase of the first sigal within a first prescribed shifting range;
  - a coupler to separate an output of the first amplitude invariant phase shifter into I and Q channel signals having approximately a 90° phase difference relative to each other;
  - a second amplitude invariant phase shifter to shift a phase of the first channel signal by a first fixed amplitude within a second prescribed shifting range;
  - a third amplitude invariant phase shifter to shift a phase of the second channel signal by a second fixed amplitude within a third prescribed shifting range; and
  - a combiner to receive signals from the second and third invariant phase shifters and calculate a vector sum thereof and generate the vector modulated signal.

16. The circuit of claim 15, wherein the first amplitude invariant phase shifter delays the first signal at fixed intervals within shifting range of approximately 0°~360°.

17. The circuit of claim 15, wherein the second amplitude invariant phase shifter delays the first channel signal by a phase within a phase shifting range of approximately 0°18 90°, and wherein the third amplitude invariant phase shifter delays the second channel signal by a phase within a phase shifting range of approximately 0°~90°.

18. The circuit of claim 15, wherein the vector modulated signal has a phase in the range of 0°~360° in a polar coordinate system.

* * * * *